Figure 1:
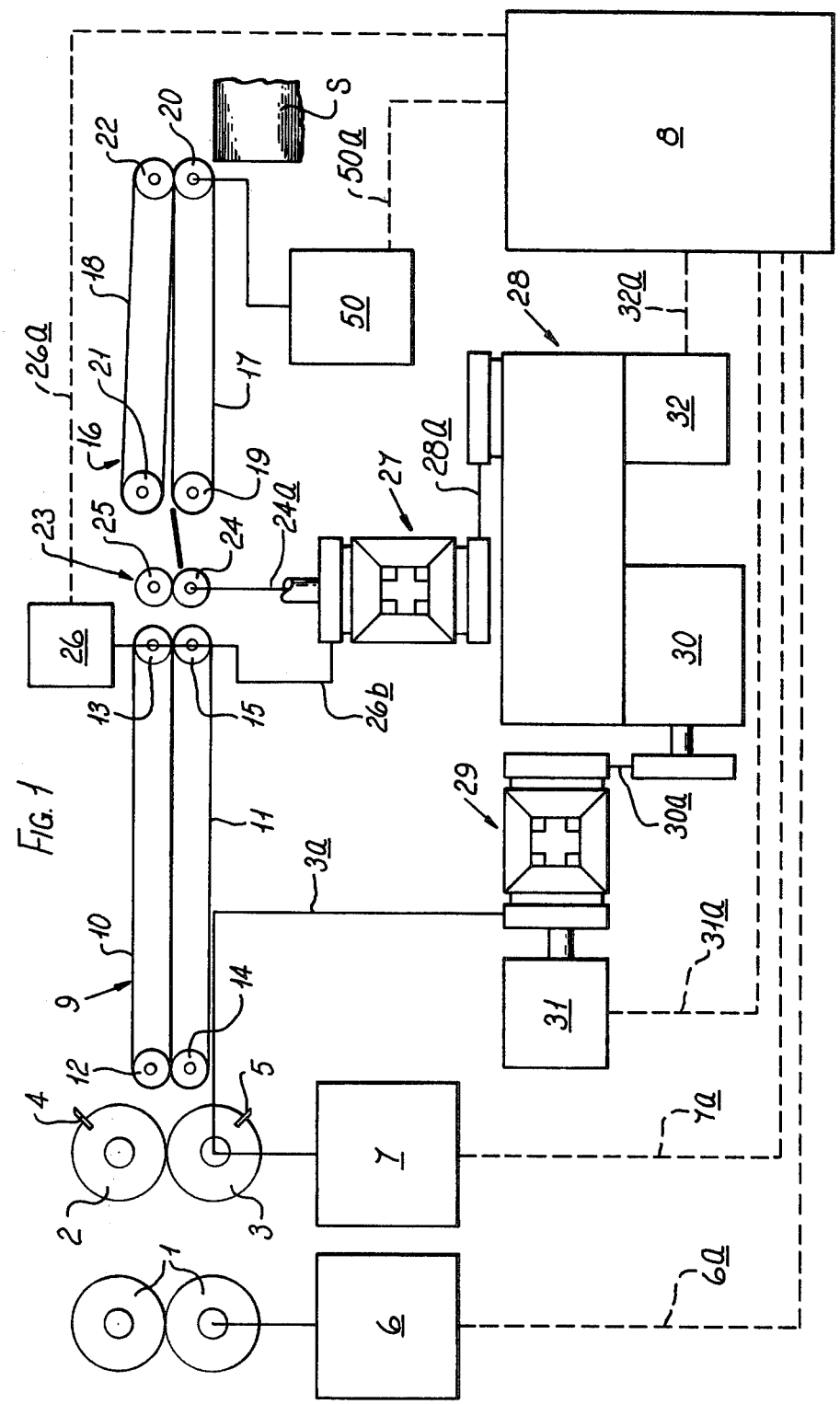

United States Patent [19]

Wood

[11] 4,184,392

[45] Jan. 22, 1980

[54] WEB CUTTING MACHINES

[75] Inventor: David Wood, Bristol, England

[73] Assignee: Masson Scott Thrissell Engineering Ltd., London, England

[21] Appl. No.: 863,509

[22] Filed: Dec. 22, 1977

[30] Foreign Application Priority Data

Dec. 30, 1976 [GB] United Kingdom ............... 54360/76
Aug. 5, 1977 [GB] United Kingdom ................. 3267/77

[51] Int. Cl.² ............................................. B65H 5/24
[52] U.S. Cl. ........................................... 83/88; 83/79; 83/110; 271/69; 271/203
[58] Field of Search .................... 271/69, 202, 203; 83/88, 110, 79

[56] References Cited

U.S. PATENT DOCUMENTS

| | | | |
|---|---|---|---|
| 2,670,955 | 3/1954 | Strecker | 271/202 |
| 3,178,174 | 4/1965 | Schneider | 271/202 X |
| 3,507,489 | 4/1970 | Wilshin et al. | 271/202 X |
| 3,565,423 | 2/1971 | Kluth | 271/202 X |
| 3,595,564 | 7/1971 | DeYoung | 271/202 X |
| 3,827,545 | 8/1974 | Buhayar | 271/203 X |
| 3,907,275 | 9/1975 | Bossons | 271/69 |
| 3,947,021 | 3/1976 | Plate | 271/80 X |
| 3,954,367 | 5/1976 | Ambler et al. | 226/198 X |
| 3,994,221 | 11/1976 | Littleton | 271/202 X |

*Primary Examiner*—J. M. Meister
*Attorney, Agent, or Firm*—Seidel, Gonda, Goldhammer & Panitch

[57] ABSTRACT

In a machine for cutting a paper web into sheets and forming them into a stack, the sheets are fed from the cutter to a primary conveyor on which they are spaced apart, and then to a secondary conveyor driven at a slower speed so that the sheets are overlapped, and finally fed onto the top of a stack. In one arrangement a pair of rollers, between which the sheets are gripped, is positioned between adjacent ends of the primary and secondary conveyors, which rollers are driven at a speed which is cyclically variable between the speeds of the two conveyors so as to decelerate the sheets. In another arrangement the secondary conveyor is dispensed with and the sheets are fed directly onto the stack from the variable speed rollers.

3 Claims, 4 Drawing Figures

WEB CUTTING MACHINES

This invention concerns improvements in or relating to web cutting machines, and in particular to machines for cutting webs of paper transversely between a pair of knives (one or both of which may be rotated) into discrete lengths or sheets and stacking them and to sheet feeding apparatus for such machines. The length of the sheets is determined by the ratio between the number of cuts made per minute and the rate at which the web is fed between the knives. In order to meet the needs of the user it is necessary to vary the length of sheets cut within certain limits depending upon their intended end use.

Prior to forming stacks from cut sheets moving at high speed after being cut from a continuous web, some form of sheet retardation is essential. In machines of the above type it is common practice to first accelerate the cut sheets as they emerge from the transverse cutter in order to space them apart from one another along a primary conveyor and then to transfer them on to a secondary conveyor travelling at a slower speed than the primary conveyor in order to effect partial overlapping of the adjacent sheets which are then ejected from the end of the secondary conveyor on to a layboy or delivery unit to form a stack. To ensure that the sheets take up the speed of the secondary conveyor, when the trailing edge of each sheet has just emerged from the primary conveyor, the leading edge is allowed to contact a series of aligned 'stop' rolls disposed across the width of the machine. These rolls are usually positioned some distance along the secondary conveyor (considered in the direction of sheet travel) and, as they are driven from the tapes forming this conveyor, the rolls have an equal peripheral speed.

This method of retardation has limitations with regard to machine speed and sheet weight since the kinetic energy of each moving sheet is dissipated virtually instantaneously. This causes ripples across the sheet which are only limited by the upper and lower tapes forming the secondary conveyor. Also there is a danger that the leading edge of the sheet may be damaged as it comes into contact with the stop rolls.

It is also known to act on the sheet near its trailing edge by means of vertically reciprocating rolls which are freely rotatable in a carrier bracket. This method has advantages over the 'stop' rolls in that the kinetic energy of the high speed sheets is effectively destroyed. However the reciprocating rolls are noisy and, due to the suddenly applied nip load, some skidding of the rolls is likely and again there is the danger of the sheets being marked.

According to the present invention there is provided sheet feeding apparatus for web cutting machines comprising feed means for said web, means for cutting said web transversely to its direction of travel at spaced positions therealong to produce a succession of sheets, means to drive said feed means and said cutting means, a primary conveyor arranged to receive sheets from said cutting means and feed them at a first speed towards a further conveyor means, moving means for driving said primary conveyor, and further means to drive said further conveyor means at a speed which is cyclically variable between said first speed and a second and lower speed.

Conveniently said further conveyor means may be adapted to grip each sheet in turn when the speed of said further conveyor means equals said first speed and to release each sheet when the speed of said further conveyor means equals said second and lower speed.

The further conveyor means may comprise a pair of rollers positioned respectively above and below the path of travel of said sheets and between which said sheets are fed.

In one arrangement the apparatus may further include a secondary conveyor, further moving means for driving said secondary conveyor at a slower speed than said primary conveyor, wherein said further conveyor means is positioned between adjacent ends of said primary and secondary conveyors, and said further drive means drives said further conveyor means at a speed variable between the respective speeds of said primary and secondary conveyors so as to decelerate said sheets.

In an alternative arrangement the apparatus may further include stacking means for said sheets wherein said stacking means is so positioned that said sheets are fed directly to said stacking means from said further conveyor means.

It is usual in known sheet stacking apparatus to provide a pair of rollers, positioned downstream of the secondary conveyor, for feeding the sheets onto the stack being formed, the rollers being driven so that, irrespective of the speed of the secondary conveyor, the sheets are always fed onto the stack at a speed which is high enough for efficient stacking. In the present invention said further drive means may be so arranged that said second speed is never less than a speed necessary for efficient stacking.

The further drive means may, in one form include a variable ratio gear box, having an input shaft and an output shaft, a cyclic speed unit adapted to receive a constant speed input and deliver a cyclically varying speed output, first and second differential gears each having three input/outputs, and a control motor, wherein one input/output of said first differential gear is connected to the output shaft of said gear box, a second input/output of said first differential gear being connected to said drive means for said primary conveyor and the third input/output of said first differential being connected to said further conveyor means, one input/output of said second differential gear is connected through said cyclic speed unit to the input shaft of said gear box, a second input/output of said second differential gear being connected to said drive means for said cutting means and the third input/output of said second differential gear being connected to said control motor.

Alternatively said further drive means may include operating means drivingly connected to one of said pair of rollers, and control means, electrically connected to said operating means, wherein said control means is adapted to produce a signal indicative of the speed at which said further conveyor means is to be driven, said operating means being arranged to respond thereto so as to drive said further conveyor means at the desired speed.

Figure 2:
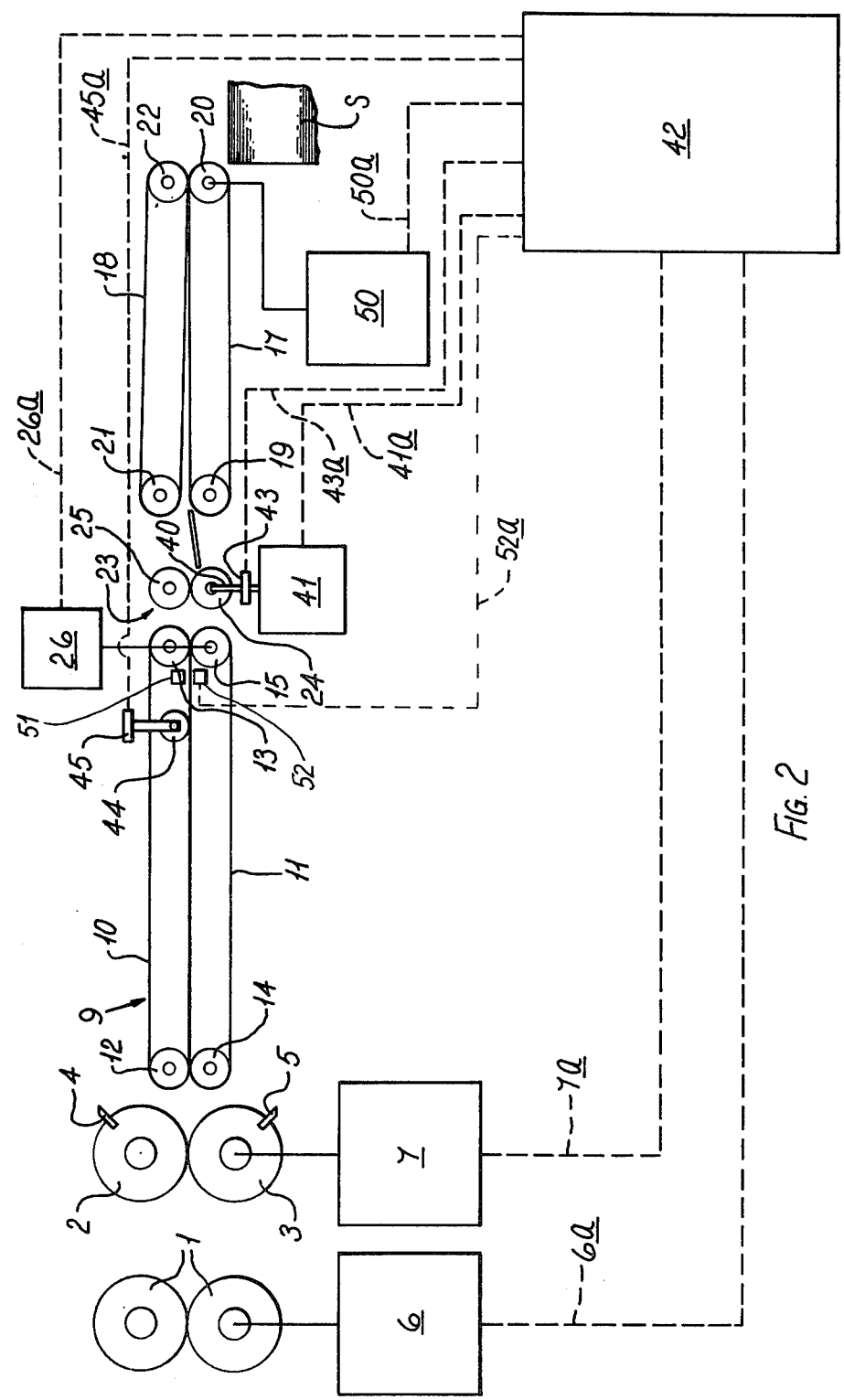
Figure 3:
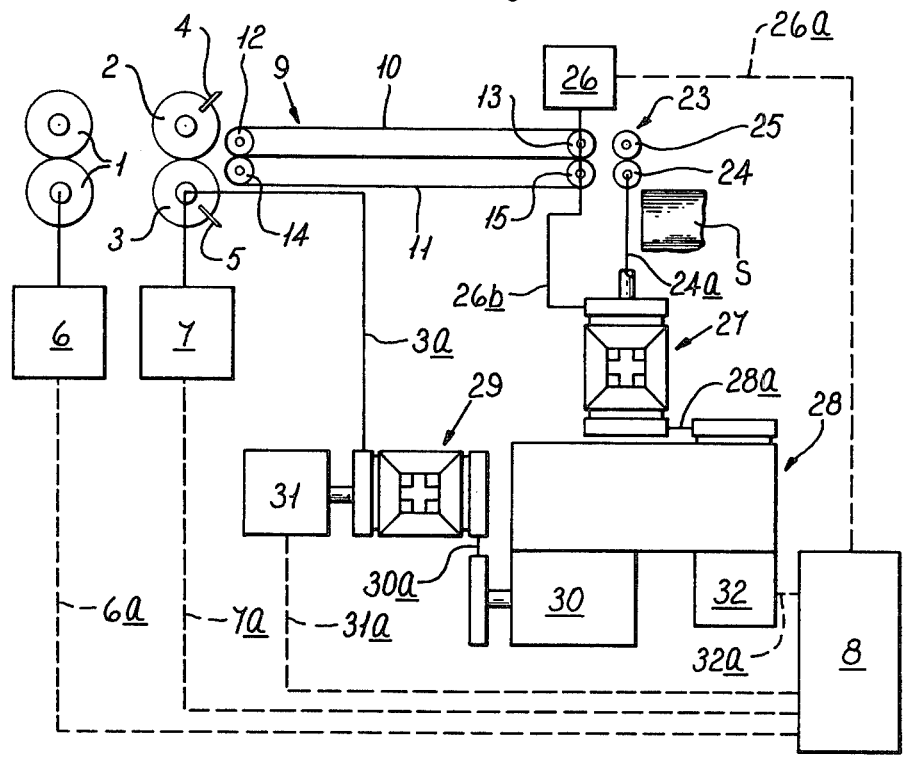
Figure 4:
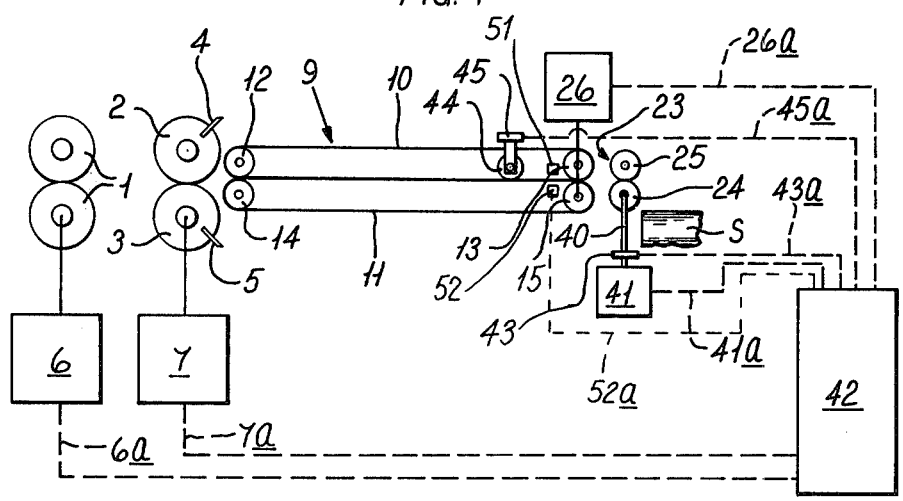

The invention will now be described, by way of example only, with reference to the accompanying drawings in which:

FIG. 1 is a diagrammatic view of a web cutting machine incorporating one form of sheet feeding apparatus according to the invention, FIG. 2 is a view similar to FIG. 1 but showing a further form of sheet feeding apparatus, FIG. 3 is a diagrammatic view of a web cutting machine incorporating one form of sheet feeding apparatus according to the invention for forming the sheets into a stack, and FIG. 4 is a view similar to FIG. 3 but showing a modified form of apparatus for forming the sheets into a stack.

In the drawings mechanical connections between various units are shown as solid lines and electrical connections are shown as dotted lines.

Referring first to FIG. 1, a web of paper (not shown) is fed to the right (as viewed in the drawings) by means of a pair of draw rollers 1 and fed between a pair of rotating cutter drums 2, 3 having knife blades 4, 5 respectively, which cooperate once every revolution of the cutter drums to cut a sheet from the web. The draw rollers 1 are driven by a motor 6 and the cutter drums 2, 3 by a motor 7, both motors being connected to a control unit 8, and the speed of both motors being controlled, in known manner, by means of connections 6a, 7a respectively. Alternatively, a single motor (not shown) may be used, in conjunction with a variable ratio gear box in known manner, to drive both the rollers 1 and the cutter drums 2, 3.

From the cutter drums the sheets are fed to a primary conveyor 9 which consists of a number of cooperating upper and lower bands 10, 11 respectively, spaced apart across the width of the machine, the bands 10, 11 extending respectively between rollers 12, 13 and 14, 15. The sheets are carried along by being gripped between adjacent runs of the bands 10, 11. The linear speed of the conveyor 9 is greater than the speed at which the sheets are fed to it from the cutter drums 2, 3 so that the sheets become spaced apart from one another along the primary conveyor 9.

On emerging from the downstream end of the conveyor 9 the sheets are fed towards a secondary conveyor 16 having upper and lower bands 17, 18 which extend respectively between rollers 19, 20 and 21, 22. The bands 17, 18 are driven by a motor 50, the speed of which is controlled from the unit 8 through connection 50a, in known manner. The linear speed of the secondary conveyor 16 is slower than that of the primary conveyor 9 so that each sheet being carried on the secondary conveyor 16 overlaps the preceding sheet by a predetermined distance.

The speed of the sheets is reduced as they pass from the conveyor 9 to the conveyor 16 by a further or intermediate conveyor 23 consisting of a driven roller 24 and a sprung cooperating nip roller 25, which rollers are driven at a cyclically-varying speed. The arrangement is such that as the leading end of a sheet passes into the nip of the rollers 24, 25 the latter are being driven at a peripheral speed equal to the linear speed of the conveyor 9, and as the trailing end of the sheet passes out of the nip of the rollers 24, 25 the latter are being driven at a peripheral speed equal to the linear speed of the conveyor 16. During the period that the sheet is being fed by the rollers 24, 25, the speed of the latter, and thus also the speed of the sheet, is progressively reduced. After the sheet passes clear of the rollers 24, 25 their speed is increased so that by the time the leading end of the next sheet enters the nip of rollers 24, 25 the latter are again being driven at a peripheral speed equal to the linear speed of the conveyor 9, as will be described later. From the secondary conveyor 16 the overlapped sheets are fed into a layboy (not shown) of any known type and formed into a stack S.

The mechanism for driving the rollers 24, 25 at the cyclically varying speed required to decelerate the sheets to the speed of the conveyor 16 will now be described.

The conveyor 9 is driven by a motor 26, the speed of which is controlled from the unit 8 along connection 26a, in known manner. The drive from motor 26 is also connected to one input/output of a differential gear 27, as shown by the connection 26b, a second input/output of the gear 27 being connected to the driven roller 24, by connection 24a, and the third input/output of the gear 27 being connected to the output shaft of a variable ratio gear box 28, of any known form, via connection 28a.

The cutter drums 2,3 are driven, as mentioned previously, from the motor 7, and this drive is also connected to one input/output of a second differential gear 29, via connection 3a, a second input/output of the gear 29 being connected to the input shaft of a cyclic speed unit 30 via connection 30a, and the third input/output of the gear 29 being connected to a control motor 31, the motor 31 being controlled from the unit 8 via connection 31a. The unit 30 may be of any known convenient type (e.g. a Geneva wheel type) adapted to receive a constant speed input and deliver a cyclically varying speed output. The output shaft of the unit 30 is connected to the input shaft of the gear box 28.

A further motor 32, controlled from unit 8, via connection 32a, is provided to automatically change the ratio between the input and output shafts of the gear box 28 at the required times.

In operation, a sheet being fed by the conveyor 9 emerges from the downstream end thereof, and its leading edge enters the nip between rollers 24, 25 which are being driven at a peripheral speed equal to the linear speed of the conveyor 9 and thus also the sheet speed. This condition is maintained until a predetermined length of the sheet has passed through the nip of rollers 24, 25, at which time the unit 30 causes the speed of the roller 24 to be reduced and the sheet will be progressively decelerated until its speed equals the linear speed of the conveyor 18. The arrangement is such that the sheet reaches this speed when the trailing edge of the sheet reaches the nip between the rollers 24, 25. The unit 30 then causes the speed of the roller 24 to be increased until it again matches the linear speed of conveyor 9, this acceleration taking place before the leading edge of the next sheet reaches the nip of rollers 24, 25.

Whenever there is a change in the length of sheets being cut from the web and/or the amount of overlap required, certain machine settings need to be changed. Thus, when sheets of a different length are to be fed, the ratio between the input and output shafts of the gear box 28 must be altered, this being accomplished by operation of the motor 32. Further, the timing of the deceleration of the roller 24 must also be changed and this is accomplished by means of the control motor 31 via the differential gear 29, the motor 31 being normal stationary and only driven a required number of revolutions on receiving a control signal from unit 8.

The control unit 8 incorporates normal machine functions such as control of web speed, pre-selection of sheet length and secondary conveyor speed. From this data the necessary outputs are computed for input to the various motors, in known manner.

A modified form of apparatus for driving the rollers 24, 25 will now be described with reference to FIG. 2. As the apparatus shown in FIG. 2 differs from that in FIG. 1 only in respect of that part of the apparatus for driving the rollers 24, 25, only that part of the apparatus of FIG. 2 will be described. Parts which are the same in both Figures have been given the same reference number.

The roller 24, fixed on a shaft 40, is connected to, and driven by, a motor 41 which is controlled from a control unit 42 via a connection 41a. The speed at which the roller 24 is being driven is monitored by an encoder 43, of any convenient known form, mounted on the shaft 40, and linked to the unit 42 by connection 43a. The speed at which the sheets are being fed by the primary conveyor 9 is monitored by a wheel 44 which is rotated by being in contact with the sheets. An encoder 45 is driven from the wheel 44 and linked to the unit 42 by connection 45a. To ensure that the speed of the rollers 24, 25 is reduced at the correct time (i.e. when the predetermined length of the sheet has passed through the nip of rollers 24, 25), the trailing edge of the sheet is detected as it passes between a light source 51 and associated photoelectric cell 52, the latter being linked to the unit 42 by connection 52a. The light source 51 and cell 52 are mounted on slides (not shown) so that they may be reset when the length of the sheets being cut and fed is changed—for such resetting, the source and cell are moved horizontally to a position such that when the predetermined length of sheet has passed through the nip of rollers 24, 25 the trailing edge of the sheet has just passed the position at which the light beam from source 51 is no longer interrupted, and illuminates the cell 52. A signal is then sent to the unit 42 which, in turn, transmits a signal to the motor 41 to reduce the speed of the rollers 24, 25 and thus the sheet, the speed of the rollers 24, 25 being increased again after the trailing edge of the sheet passes the nip of the rollers. As with the unit 8, the control unit 42 incorporates normal machine settings such as control of web speed, pre-selection of sheet length and secondary conveyor speed, and additionally receives signals from the encoders 43, 45 and the photoelectric cell 52. From this data the necessary control output is computed for input to the motor 41 so that the speed of the latter is alternately decreased and increased at the correct times depending on the length of the sheets being fed.

The operation of rollers 24, 25, as described above, make it possible for the sheets to be fed on to the stack S directly from those rollers. Reference will now be made to FIGS. 3 and 4 which respectively show the apparatuses of FIGS. 1 and 2 modified so that the stack S, in each case, is positioned immediately downstream of the rollers 24, 25. As the apparatuses shown in FIGS. 3 and 4 differ from those shown in FIGS. 1 and 2 respectively only in that in each case the secondary conveyor 16, motor 50 and connection 50a are dispensed with, the apparatus shown in FIGS. 3 and 4 will not be described again. Parts which are the same in corresponding Figures have been given the same reference numerals.

The operation of the apparatuses of FIGS. 3 and 4 is identical with that of FIGS. 1 and 2, as described previously, up to and including the point at which the leading edge of the sheet emerges from the conveyor 9, and will be described from this point.

On emerging from the downstream end of the conveyor 9 the sheets are fed into the nip of rollers 24, 25 and then directly into a layboy (not shown) of any known type and formed into the stack S. The arrangement is such that as the leading edge of a sheet passes into the nip of the rollers 24, 25, the latter are being driven at a peripheral speed equal to the linear speed of the conveyor 9 and thus also the sheet speed. This condition is maintained until a predetermined length of the sheet has passed through the nip rollers 24, 25, at which time the unit 30, in the apparatus of FIG. 3, and the unit 42 in the apparatus of FIG. 4, causes the speed of the roller 24 to be reduced and the sheet will be progressively decelerated until its speed equals the speed necessary for efficient stacking. The sheet reaches this speed when the trailing edge of the sheet reaches the nip between the rollers 24, 25, at which time the speed of the roller 24 commences to increase until it again matches the linear speed of conveyor 9, this acceleration taking place before the leading edge of the next sheet reaches the nip of rollers 24, 25.

It should be noted that the distance between the downstream end of the conveyor 9 and the conveyor 23 is preferably chosen so that the trailing edge of a sheet is clear of conveyor 9 at the beginning of the period during which the rollers 24, 25 are being decelerated, otherwise some buckling of the sheet would occur due to different portions of the sheet being fed at different speeds. Alternatively, the rollers 13, 15 may be vertically separated slightly so that the rear part of the sheet is not gripped between bands 10, 11 when the rollers 24, 25 are being decelerated.

The present invention may also be used in machines of a more complex arrangement. One example of such a machine is where two layboys are provided and arranged one after the other in the direction of sheet travel. In such an arrangement diverter means is provided upstream of the first layboy to direct sheets either to that layboy or the second one. Whilst sheets are being fed to the second layboy, rollers, corresponding to the rollers 24, 25, and positioned adjacent the first layboy, are driven at a constant speed equal to the linear speed of the primary conveyor, the cyclically varying speed being imposed again when sheets are once more fed to the first layboy.

I claim:

1. Sheet feeding apparatus for web cutting machines comprising feed means for said web, means for cutting said web transversely to its direction of travel at spaced positions therealong to produce a succession of sheets, means to drive said feed means and said cutting means, a primary conveyor, further conveyor means, said primary conveyor being arranged to receive sheets from said cutting means and feed them at a first speed towards said further conveyor means, means for driving said primary conveyor, and further means to drive said further conveyor means at a speed which is cyclically variable between said first speed and a second and lower speed, the improvement characterized by said further drive means including a variable ratio gear box having an input shaft and an output shaft, a cyclic speed unit adapted to receive a constant speed input and deliver a cyclically varying speed output, first and second differential gears each having three input/outputs, a control motor, wherein one input/output of said first differential gear is connected to the output shaft of said gear box, a second input/output of said first differential gear being connected to said means for driving said primary conveyor, the third input/output of said first differential gear being connected to said further conveyor means, one input/output of said second differential gear is connected through said cyclic speed unit to the input shaft of said gear box, a second input/output of said second differential gear being connected to said drive means for said cutting means, and the third input-/output of said second differential gear being connected to said control motor.

2. Apparatus as claimed in claim 1 further including a secondary conveyor, further moving means for driving said secondary conveyor at a slower speed than said primary conveyor, wherein said further conveyor means is positioned between adjacent ends of said primary and secondary conveyors, and said further drive means drives said further conveyor means at a speed variable between the respective speeds of said primary and secondary conveyors so as to decelerate said sheets.

3. Apparatus as claimed in claim 1 further including stacking means for said sheets wherein said stacking means is so positioned that said sheets are fed directly to said stacking means from said further conveyor means.

* * * * *